2,999,110
1-(SUBSTITUTED PHENYL ALKANOYL)-3-ALKOXY UREAS
William A. Lott, Maplewood, and Jack Bernstein and Barbara Stearns, New Brunswick, N.J., assignors to Olin Mathieson Chemical Corporation, New York, N.Y., a corporation of Virginia
No Drawing. Filed Aug. 5, 1959, Ser. No. 831,692
9 Claims. (Cl. 260—553)

This application is a continuation-in-part of our parent application, Serial No. 693,035, filed October 29, 1957, now abandoned.

This invention relates to, and has for its object, the provision of: (A) compounds of the general formula

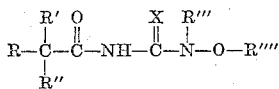

wherein R is hydrogen, lower alkyl, lower alkenyl, monocyclic aryl, or monocylic ar(lower alkyl); R' and R'' are each hydrogen, lower alkyl, or monocyclic aryl; R' and R'' together with the carbon to which they are joined is lower cycloalkyl (i.e. a cycloalkyl radical of less than eight carbon atoms); R, R' and R'' together with the carbon to which they are joined is phenyl or pyridyl; R''' and R'''' are each hydrogen or lower alkyl; and X is either O or S; (B) pharmacologically acceptable salts thereof; and (C) methods of preparing these compounds.

The compounds of this invention are useful as central nervous system depressants, and essentially as oral hypnotics. The compounds of this invention may be administered orally, alone or in combination with phenobarbital, diphenylhydantoin sodium, trimethadione or paramethadione in the treatment of psychomotor epilepsy, grand mal and petit mal epilepsies and in the management of mixed seizures.

The compounds of this invention are prepared by the method of this invention which essentially comprises interacting a member of the group consisting of an isocyanate ester and an isothiocyanate ester of the general Formula I:

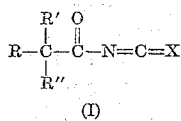

(I)

with an oxyamine (or salts thereof) of the general Formula II:

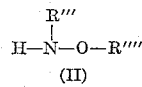

(II)

wherein R, R', R'', R''', R'''', and X have the meaning given hereinbefore, in an organic solvent for the reactants, heating and recovering the reaction products.

Utilizable reactants I include aralkanoylisocyanates and isothiocyanates, such as α-phenylbutrylisocyanate, α-phenylbutyrylisothiocyanate, α-phenylhexanoylisocyanate, phenylacetylisocyanate, diphenylacetylisocyanate, α,α-dimethylphenylacetylisocyanate, α,α-diethylphenylacetylisocyanate, hydrocinnamoylisocyanate, α,α-diethylhydrocinnamoylisocyanate, α-(p-chlorophenyl) butyrylisocyanate, α-(p-chlorophenyl)-α-ethylbutyrylisocyanate, α-(p-tolyl)-butyrylisocyanate, α-(p-anisyl)butyrylisocyanate, α-(p-anisyl)-α-ethylbutyrylisocyanate, 1-phenyl-1-cyclopentylcarbonylisocyanate, and 1-phenyl-1-cyclohexylcarbonylisocyanate; lower alkanoylisocyanates and isothiocyanates, such as acetylisocyanate, propionyl isothiocyanate, 2-ethyl-3-methylhexanoylisocyanate, 2,2-diethylbutyrylisocyanate, and pivaloylisocyanate; lower alkenoylisocyanates and isothiocyanates, such as 2,2-dimethyl-4-pentenoylisocyanates, 4-hexenoylisothiocyanate, and 2-phenyl-3-butenoylisocyanate; benzoylisocyanate; benzoylisothiocyanate; isonicotinoylisocyanate; isonicotinoylisothiocyanate; nicotinoylisocyanate and picolinoylisocyanate.

Utilizable reactants II include hydroxylamine, hydroxylamine hydrochloride, hydroxylamine sulfate, methoxyamine hydrochloride, ethoxyamine hydrochloride, propoxyamine hydrochloride, butoxyamine hydrochloride, N-methylhydroxylamine, methoxymethylamine, ethoxyethylamine, N-methylhydroxylamine hydrochloride and methoxymethylamine hydrochloride.

Organic solvents utilizable when oxyamine salts are used include, inter alia, pyridine, alkylpyridines, morpholine, dimethylaniline, and quinoline. When the oxyamine per se is used, organic solvents utilizable, in addition to those utilizable with the salts, include, inter alia, benzene, ether, toluene, dioxane or other inert organic solvents.

When it is desired to obtain the salts of this invention, compounds A are reacted with an appropriate base, e.g., sodium carbonate, potassium carbonate, sodium hydroxide, barium hydroxide, sodium alkoxides, alcoholic ammonia or pyridine; alternatively, the salt form may be obtained directly (cf. for example, Example IV).

The following examples are illustrative, but by no means limitative, of the invention (all temperatures recorded being centigrade):

EXAMPLE I 1-(2-ethyl-3-methylhexanoyl)-3-hydroxyurea (a) 2-ethyl-3-methylhexanoylisocyanate.—105 g. (0.7 mole) of silver cyanate is suspended in 1 liter of ether and 116 g. (0.6 mole) of 2-ethyl-3-methylhexanoyl chloride (J. Am. Chem. Soc. 58, 1352) in 300 cc. of ether is added slowly at 30°. After complete addition the reaction mixture is refluxed for 5 hours, the grayish solid gradually changes to a blue-violet color (AgCl). The reaction mixture is then cooled and the solid filtered off. The ether is then removed and the residue fractionated to yield about 83 g. (75%) of 2-ethyl-3-methylhexanoylisocyanate, boiling at 58–60°/5 mm.

(b) 1-(2-ethyl-3-methylhexanoyl)-3-hydroxyurea.— 17.4 g. (0.25 mole) of hydroxylamine hydrochloride is dissolved in 250 cc. dry pyridine and 41 g. (0.22 mole) of 2-ethyl-3-methylhexanoylisocyanate is added slowly. The temperature is allowed to rise to 50° and, after complete addition the reaction mixture is heated for 3 hours on a steam bath. The pyridine is removed under reduced pressure and the viscous residue is poured into ice water and acidified with 20% HCl. The oil is extracted with 2 x 500 cc. ether. The ether is dried over MgSO₄ and removed and the residue is crystallized. After trituration with hexane, the 1-(2-ethyl-3-methylhexanoyl)-3-hydroxyurea solid weighs about 25 g. (52%) and melts at about 104–107°. After recrystallization from 400 cc. benzene, the product melts at about 117–119° and weighs about 18.5 (39%).

EXAMPLE II 1-(2-ethyl-3-methylhexanoyl)-3-methoxyurea 20.9 g. (0.25 mole) of methoxyamine hydrochloride is dissolved in 250 cc. of dry pyridine and 41 g. (0.22 mole) of 2-ethyl-3-methylhexanoylisocyanate is added at 35°, the temperature being allowed to rise to 60°. After complete addition, the reaction mixture is heated three hours on a steam bath at 85°. The pyridine is removed under reduced pressure and the semi-solid residue poured into ice and water and acidified with 20% HCl. The oil which precipitates is extracted with ether. The ether is dried over MgSO₄ and then removed by distillation. The residue (55 g.) is fractionated to yield about 34 g. (67%) of 1-(2-ethyl-3-methylhexanoyl)-3-methoxyurea, boiling at about 167–168°/1.5 mm., $n_D^{24}$=1.4698.

EXAMPLE III

3-methoxy-1-(2-phenylbutyryl) urea 9 g. (0.11 mole) of methoxyamine hydrochloride is dissolved in 150 cc. dry pyridine at 40° and 20 g. (0.106 mole) of 2-phenylbutyrylisocyanate (J. Am. Chem. Soc. 62, 1595) is added slowly. The temperature is allowed to rise to 60°. After complete addition, the reaction mixture is heated 2 hours on a steam bath. The pyridine is removed under reduced pressure and the residue added to cracked ice and about 200 cc. 10% HCl. A white crystalline solid forms which, when filtered and dried, weighs about 24 g. (96%), M.P. about 122–125°. After recrystallization from 500 cc. water plus 350 cc. alcohol, the 3-methoxy-1-(2-phenylbutyryl) urea is constant melting at about 137–138°.

EXAMPLE IV

3-hydroxy-1-(2-phenylbutyryl) urea (a) 3 - hydroxy - 1 - (2 - phenylbutyryl) urea, pyridine salt.—15.7 g. (0.22 mole) of hydroxylamine hydrochloride is dissolved in 300 cc. of dry pyridine and 37 g. (0.2 mole) of 2-phenylbutyrylisocyanate (J. Am. Chem. Soc. 62, 1595) is added slowly at 30–40° (external cooling). After complete addition, the reaction is heated on a steam bath at 85° for 2 hours. After 200 cc. of pyridine is removed under reduced pressure and the residue added to 600 cc. of water, the pyridine salt of 3-hydroxy-1-(2-phenylbutyryl) urea precipitates, is filtered, washed with water and air-dried. It weighs about 33 g. (55%), M.P. about 106–108°. After recrystallization from benzene the melting point is about 107–109°.

(b) 3-hydroxy-1-(2-phenylbutyryl) urea.—20 g. of the pyridine sale of (a) is dissolved in 200 cc. of warm alcohol, cooled and to the cooled solution is added about 100 cc. of 20% HCl. After the addition of an additional 1 liter of water, a crystalline solid precipitates. The product, filtered and air-dried, weighs about 19 g., M.P. about 120–121°. After recrystallization from 400 cc. benzene, the 3-hydroxy-1-(2-phenylbutyryl) urea melts at about 121.5–122.5°.

EXAMPLE V

1-(2-ethyl-3-methylhexanoyl)-3-ethoxyurea

Use of a molar equivalent of ethoxyamine hydrochloride in place of methoxyamine hydrochloride in Example II yields 1-(2-ethyl-3-methylhexanoyl)-3-ethoxyurea.

EXAMPLE VI

3-methoxy-1-(2-phenylhexanoyl) urea

Use of a molar equivalent of 2-phenylhexanoylisocyanate (prepared following the method described in J. Am. Chem. Soc. 62, 1595) in place of 2-phenylbutyrylisocyanate in Example III yields 3-methoxy-1-(2-phenylhexanoyl) urea.

EXAMPLE VII

3-butoxy-1-(2-phenylbutyryl) urea

To a soltuion of 15 g. (0.12 M) of n-butoxyamine hydrochloride in 125 cc. of pyridine is added 10 g. (0.1 M) of 2-phenylbutyrylisocyanate. After complete addition the reaction is heated on a steam bath for 6 hours. The solution is then poured into 200 cc. 20% HCl and cracked ice. A gummy precipitate forms which granulates readily. This is filtered and air dried to yield about 26 g. of product melting at about 82–85°. After recrystallization from 350 cc. of alcohol plus 200 cc. of water the compound weighs about 18 g. and is constant melting at about 93–94°.

EXAMPLE VIII

3-methoxy-1-phenylacetylurea

To a solution of 8.3 g. (0.1 M) of methoxyamine hydrochloride in 200 cc. of pyridine is added 13.3 g. (0.1 M) of phenylacetylisocyanate. The reaction is heated on a steam bath for 2 hours; the solution is then poured onto cracked ice and the mixture made strongly acid with 20% HCl. The white crystalline precipitate is filtered and dried to give about 15 g. of product melting at about 177–178°. After recrystallization from 500 cc. alcohol the melting point is about 177–178°.

EXAMPLE IX

3-methoxy-1-(2,2-dimethyl-4-pentenoyl) urea (a) 2,2-dimethyl-4-pentenoylchloride.—A solution of 25 g. (0.19 M) of 2,2-dimethyl-4-pentenoic acid in 70 cc. of thionyl chloride is refluxed on a steam bath for 4 hours. After the first few minutes' warming, a vigorous evolution of HCl occurs (no heat evolved); after the reaction subsides, the refluxing is continued. The excess thionyl chloride is removed on a water pump and the residue distilled rapidly (to avoid foaming) to yield the product boiling at about 65–85°/100 mm. This crude material is redistilled to yield about 20 g. of product boiling at about 80–81°/92 mm.

(b) 2,2-dimethyl-4-pentenoylisocyanate.—To a suspension of 22.5 g. (0.15 M) of silver cyanate in 300 cc. of ether is added a solution of 20 g. (0.13 M) of 2,2-dimethyl-4-pentenoyl chloride in 50 cc. ether. The reaction mixture is refluxed for 18 hours, cooled, and the solid filtered off. The ether is removed from the filtrate and the residue fractionated to yield about 8 g. of product boiling at about 87–89°/40 mm.

(c) 3-methoxy-1-(2,2-dimethyl-4-pentenoyl)urea.—To a solution of 5 g. (0.06 M) of methoxyamine hydrochloride in 150 cc. of pyridine is aded 8 g. (0.052 M) of 2,2 - dimethyl - 4 - pentenoylisocyanate. The mixture is heated on a steam bath for 5 hours and then the pyridine removed under reduced pressure. The residue is poured into cracked ice and made strongly acid with 20% HCl. An oily precipitate forms which crystallizes on standing. The mixture is extracted with 500 cc. of ether, the ether dried over MgSO₄ and distilled off. The residue is dissolved in 30 cc. of hexane and allowed to cool overnight. The crystals, filtered off, weigh about 4 g. and melt at about 63–64°. After recrystallization from hexane the product melts at about 63–64°.

EXAMPLE X

3-methoxy-1-pivaloylurea

To a suspension of 44.7 g. (0.3 M) of silver cyanate in 450 cc. of ether is added a solution of 20 g. (0.17 M) of pivaloyl chloride in 50 cc. ether. After complete addition the mixture is refluxed for 18 hours, cooled, and the solid filtered off. The ether filtrate containing pivaloylisocyanate (not isolated) is added to a solution of 20 g. (0.24 M) of methoxyamine hydrochloride in 250 cc. of pyridine at 30–40°. The reaction is stirred at this temperature for one hour and then the ether distilled off. The resulting pyridine solution is heated 4 hours on a steam bath and then the pyridine removed under reduced pressure. The residue is poured onto 200 cc. 20% HCl and cracked ice. A finely divided precipitate is filtered off and dried. Weight about 7 g.; melting point about 138–141°. After recrystallization from 100 cc. of 50% alcohol, the product melts at about 148–150°.

EXAMPLE XI

1-(α,α-dimethylphenylacetyl)-3-methoxyurea

To a suspension of 45 g. (0.3 M) of silver cyanate in 350 cc. of ether is added slowly a solution of 36.4 g. (0.2 M) α-phenylisobutyryl chloride in 50 cc. of ether. After complete addition the mixture is refluxed for 18 hours. The solid is filtered off and the ether filtrate containing α-phenylisobutyrylisocyanate is added to a solution of 12.5 g. (0.15 M) of methoxyamine in 250 cc. of pyridine at 30–40° The reaction is stirred at this temperature for one hour and then the ether distilled off. The pyridine solution is heated on a steam bath for one hour and then the pyridine removed under reduced pressure. The residue is poured onto cracked ice and 20% HCl whereupon a granular precipitate forms. This is filtered off, dissolved in 400 cc. 5% NaOH, filtered and the filtrate acidified with 20% HCl. The white precipitate which forms is filtered and dried to yield about 15 g. of product melting at about 137–140°. After recrystallization from 350 cc. H₂O plus 150 cc. alcohol, the product weighs about 10.5 g. and melts at about 140–142°.

EXAMPLE XII

3-methoxy-1-(1-phenylcyclohexylcarbonyl) urea

To a suspension of 61 g. (0.4 M) of silver cyanate in 350 cc. of ether is added a solution of 36 g. (0.16 M) of 1-phenylcyclohexylcarbonyl chloride in 50 cc. of ether. After complete addition the reaction is refluxed 18 hours, cooled, and the solid filtered off. The ether filtrate containing 1-phenylcyclohexylcarbonylisocyanate is added to a solution of 16.6 g. (0.2 M) of methoxyamine in 400 cc. of pyridine at 30–40°. The mixture is stirred at this temperature for one hour and then the ether distilled off. The resulting pyridine solution is heated on a steam bath for 4 hours. The pyridine is then removed under reduced pressure and the residue poured onto cracked ice and 300 cc. 20% HCl. A gummy precipitate forms which granulates on trituration with alcohol. It is then filtered and dried. After recrystallization from aqueous alcohol the product melts at about 137–138°.

By substituting an equivalent amount of 1-phenylcyclopentyl carbonyl chloride for the 1-phenylcyclohexyl carbonyl chloride in the procedure of Example XII, 1-methoxy-3-(1-phenylcyclopentylcarbonyl) urea is obtained.

EXAMPLE XIII

1-(2,2-diethylbutyryl)-3-methoxyurea (a) *2,2-diethylbutyrylisocyanate.*—To a suspension of 30 g. (0.2 M) of silver cyanate in 350 cc. of dry ether is added slowly a solution of 25 g. (0.15 M) of 2,2-diethylbutyryl chloride. The mixture is refluxed 20 hours, cooled, and the solid filtered off. The ether is then removed from the filtrate by distillation and the residue fractionated to yield about 9 g. product boiling at about 42–45°/2–2.5 mm.

(b) *1-(2,2-diethylbutyryl)-3-methoxyurea.*—To a solution of 5 g. (0.06 M) of methoxyamine hydrochloride in 100 cc. of pyridine is added 9 g. (0.053 M) of 2,2-diethylbutyrylisocyanate. There is a temperature rise to 55° C. The mixture is heated on a steam bath for 3 hours and then the contents of the flask poured onto cracked ice and 20% HCl. The white crystalline solid, which precipitates is filtered off, weighs about 9 g., melting point about 119–120°. After recrystallization from 200 cc. 50% alcohol, the product melts at about 121–122°.

EXAMPLE XIV

1-diphenylacetyl-3-methoxyurea (a) *Diphenylacetylisocyanate.*—To a suspension of 23 g. (0.15 M) of silver cyanate in 250 cc. of dry ether is added slowly a solution of 23 g. (0.15 M) of diphenylacetylchloride in 100 cc. ether. After complete addition the reaction mixture is refluxed 5 hours. The solid is filtered off and the ether removed by distillation. The residue is fractionated to yield about 10 g. product boiling at about 141–143°/2 mm.

(b) *1-diphenylacetyl-3-methoxyurea.*—To a solution of 4.2 g. (0.05 M) of methoxyamine hydrochloride in 60 cc. of pyridine is added 10 g. (0.042 M) of diphenylacetylisocyanate. The reaction is heated on a steam bath for 3 hours. The contents of the flask is poured onto cracked ice and made strongly acid with 20% HCl. The white crystalline solid, which is filtered off and dried, weighs about 11 g., melting point 177–179° C. The solid is dissolved in dilute alkali, filtered and the filtrate acidified with 20% HCl. The crystalline solid is filtered off and after recrystallization from 250 cc. alcohol melts at about 186–188°.

EXAMPLE XV

1-(2,2-diethylbutyryl)-3-hydroxy-3 methylurea

To a solution of 5.0 g. (0.1 M) of N-methylhydroxylamine in 100 cc. of pyridine is added 16.9 g. (0.1 M) of 2,2-diethylbutyrylisocyanate. The reaction is heated four hours on a steam bath and then the pyridine is removed under reduced pressure. The residue is poured onto cracked ice and 20% HCl whereupon a white solid precipitates. This is filtered and washed with water. The product is then recrystallized from aqueous alcohol.

EXAMPLE XVI

1-(2,2-diethylbutyryl)-3-methoxy-3-methylurea

To a solution of 6.5 g. (0.1 M) of N,O-dimethylhydroxylamine (N-methoxymethylamine) in 100 cc. of pyridine is added 16.9 g. (0.1 M) of 2,2-diethylbutyrylisocyanate. The reaction is heated four hours on a steam bath and then the pyridine is removed under reduced pressure. The residue is poured onto cracked ice and 20% HCl. The white solid which precipitates is filtered off and dried. The product is purified by recrystallization from aqueous alcohol.

EXAMPLE XVII

1-(2-phenylbutyryl)-3-methoxy-2-thiourea (a) *2-phenylbutyrylisothiocyanate.*—To a solution of 10.5 g. (0.1 M) of potassium thiocyanate in 400 cc. of benzene is added with stirring 18.2 g. (0.1 M) of 2-phenyl-n-butyrylchloride. After complete addition the mixture is refluxed for six hours, cooled and the solid filtered off. The benzene solution of 2-phenylbutyrylisothiocyanate is then used without isolation.

(b) *1 - (2 - phenylbutyryl) - 3 - methoxy - 2 - thiourea.*—The benzene solution of 2-phenylbutyrylisothiocyanate of (a) is added at 30–40° to a solution of 8.4 g. (0.1 M) of methoxyamine hydrochloride in 200 cc. of pyridine. After complete addition the mixture is stirred at 30–40° for one hour and then the benzene is removed by distillation. The resulting solution is heated on a steam bath for 4 hours and then the pyridine is removed under reduced pressure. The residue is poured onto cracked ice and 20% HCl and the gummy precipitate which formed gradually solidifies. It is filtered and dried and the crude solid recrystallized from aqueous alcohol.

EXAMPLE XVIII

1-(2,2-diethylbutyryl)-3-hydroxyurea

To a solution of 21 g. (0.3 M) of hydroxylamine hydrochloride in 300 cc. of pyridine is added 33 g. (0.2 M) of 2,2-diethylbutyrylisocyanate in 200 cc. of dry ether. The reaction mixture is stirred at 40° for one and one-half hours and then heated on a steam bath for four hours. The pyridine is removed under reduced pressure and the residue is added to 150 cc. of 20% HCl with cooling. The crystalline solid which precipitates is extracted with ether. The ether is dried over magnesium sulfate, filtered and evaporated. The residue is triturated with hexane to yield about 15 g. of product melting at about 116–118°. After recrystallization from 200 cc. of water plus 60 cc. of ethanol the compound weighs about 12 g. and is constant melting at 121–122°.

EXAMPLE XIX

1-(2-ethyl-2-phenylbutyryl)-3-methoxyurea (a) *2-ethyl-2-phenylbutyryl chloride*.—A solution of 15 g. (0.077 M) of 2-ethyl-2-phenylbutyric acid in 30 cc. of thionyl chloride is refluxed for two hours and then the excess thionyl chloride is removed with a water pump. The residue is fractionated to yield about 10 g. (63%) of 2-ethyl-2-phenylbutyryl chloride, B.P. about 112–113°/8 mm.

(b) *1-(2-ethyl-2-phenylbutyryl)-3-methoxyurea*.—To a suspension of 15 g. of silver cyanate in 500 cc. of dry ether is added with vigorous stirring 10 g. of 2-ethyl-2-phenylbutyryl chloride. The mixture is then refluxed with stirring for 48 hours. The mixture is cooled, the solid filtered off and the ether filtrate added at 35–40° to a solution of 5 g. of methoxyamine hydrochloride in 100 cc. of pyridine. After complete addition, the reaction mixture is stirred at 40° for one hour and then the ether is distilled off. The remaining solution is heated on a steam bath for six hours, the pyridine is then removed under reduced pressure and the residue poured onto cracked ice and 20% HCl. A gummy precipitate forms which granulates on standing. The solid is filtered off and recrystallized from 250 cc. of 50% ethanol to yield about 6.5 g. (51%) of product melting at about 117–119°. After recrystallization from 300 cc. of 50% ethanol the compound weighs about 3.9 g. and is constant melting at about 121–122°.

EXAMPLE XX

1-acetyl-3-hydroxyurea

A solution of 8.5 g. of acetylisocyanate in 200 ml. of anhydrous ether is added dropwise with vigorous stirring to a solution of 7.0 g. of hydroxylamine hydrochloride in 150 ml. of anhydrous pyridine at 25–30°. The reaction mixture is stirred at room temperature for thirty minutes and the temperature then gradually raised to 95° by heating on a steam bath. The ether is allowed to distill from the reaction mixture during this heating. The reaction mixture is heated at 90–95° for three hours and the pyridine is then removed under reduced pressure. The cooled residue is added to 100 ml. of 10% hydrochloric acid and the crystalline solid is filtered and air-dried. Recrystallization from aqueous alcohol gives the pure 1-acetyl-3-hydroxyurea.

EXAMPLE XXI

1-acetyl-3-methoxy-3-methylurea

Following the procedure of Example XX but substituting 9.8 g. of N,O-dimethylhydroxylamine hydrochloride for the hydroxylamine hydrochloride and recrystallizing from alcohol-hexane, 1-acetyl-3-methoxy-3-methylurea is obtained.

EXAMPLE XXII

1-benzoyl-3-hydroxyurea

Following the procedure of Example XX but substituting 14.7 g. of benzoylisocyanate for the acetylisocyanate, 1-benzoyl-3-hydroxyurea is obtained.

EXAMPLE XXIII

1-benzoyl-3-methoxy-2-thiourea

A solution of 16.3 g. of benzoyl isothiocyanate in 300 ml. of anhydrous benzene is added dropwise with vigorous stirring to a solution of 8.4 of methoxyamine hydrochloride in 100 ml. of pyridine at 20–25°. The reaction mixture is stirred at room temperature for one hour and then refluxed gently for three hours. The benzene and pyridine are removed by distillation under reduced pressure and the residue poured into 200 ml. of 20% hydrochloric acid and 100 g. of ice. The solid precipitate is filtered, washed with water and air-dried. Recrystallization from aqueous alcohol yields the desired 1-benzoyl-3-methoxy-2-thiourea.

EXAMPLE XXIV

1-(3-pyridyl)-3-methoxyurea

To a suspension of 30 g. of silver cyanate in 500 ml. of anhydrous ether there is added dropwise with vigorous stirring 14 g. of nicotinoyl chloride. The reaction mixture is warmed to gentle reflux and refluxed with stirring for 48 hours. The reaction mixture is then cooled and filtered to remove the silver chloride and excess silver cyanate. The filtrate, containing the nicotinoyl isocyanate, is added dropwise at 25–30° with stirring to a solution of 8.4 g. of methoxyamine hydrochloride in 150 ml. of pyridine. The reaction mixture is stirred for one hour at room temperature and then warmed on a steam bath, the ether distilling from the reaction mixture as the temperature rises. The reaction mixture is warmed at 90–95° for an additional three hours and is then cooled and added to 100 ml. of water and 100 g. of ice. The precipitated solid is filtered and air-dried. Crystallization from aqueous alcohol gives the desired 1-(3-pyridyl)-3-methoxyurea.

EXAMPLE XXV

1-(3-pyridyl)-3-hydroxyurea

Following the procedure of Example XXIV but replacing the methoxyamine hydrochloride with 7.0 g. of hydroxylamine hydrochloride, 1-(3-pyridyl)-3-hydroxyurea is obtained.

EXAMPLE XXVI

1-(α,α-diethylhydrocinnamoyl)-3-hydroxyurea

To a suspension of 29.8 g. (0.2 M) of silver cyanate in 500 cc. of dry ether is slowly added 32.4 g. (0.1 M) of α,α-diethylhydrocinnamoyl chloride at 25°. After the addition is completed, the mixture is refluxed with stirring for 24 hours. The precipitated silver chloride is filtered off and the ether removed by distillation. The residue weighs about 18 g. and represents α,α-diethylhydrocinnamoyl isocyanate. To a solution of 7 g. (0.1 M) of hydroxylamine hydrochloride in 100 cc. of pyridine is added 18 g. (0.08 M) of α,α-diethylhydrocinnamoyl isocyanate in 60 cc. of ether. The mixture is allowed to stand at room temperature for one hour, then the ether is distilled off and the residue heated for two hours on a steam bath. The pyridine is then removed under reduced pressure and the oily residue dissolved in 100 cc. of dilute sodium hydroxide solution, filtered and made acid with 20% hydrochloric acid. A gummy precipitate forms which is isolated by decantation. The precipitate is dissolved in 75 cc. of alcohol and 100 cc. of water is added to this solution. A crystalline solid precipitates. The precipitate is filtered and weighs about 6.3 g. and melts at about 133–136°. After recrystallization from 100 cc. of 30% alcohol, the compound weighs about 4 g. and is constant melting at about 141–143°.

EXAMPLE XXVII

1-(α,α-diethylhydrocinnamoyl)-3-methoxyurea

To a solution of 8.4 g. (0.1 M) of methoxyamine hydrochloride in 100 cc. of pyridine is added 18 g. (0.08 M) of α,α-diethylhydrocinnamoyl isocyanate in 60 cc. of ether. The mixture is allowed to stand one hour at room temperature after which the ether is allowed to distill off. The residue is heated for two hours on a steam bath and the pyridine is then removed under reduced pressure. The residue is triturated with hexane to yield a solid. This solid is dissolved in 100 cc. of 10% sodium hydroxide solution and the alkaline solution made strongly acid with 10% hydrochloric acid. A gummy precipitate forms which granulates nicely. The solid is filtered and recrystallized from 150 cc. of 50% alcohol to yield about 4.3 g. of product melting at about 112–113°. Further recrystallization does not change the melting point.

EXAMPLE XXVIII

*1-[2-ethyl-2-(p-chlorphenyl)butyryl]-3-methoxyurea*

To a suspension of 37.5 g. (0.25 M) of freshly prepared silver cyanate in 500 cc. of dry ether is added slowly 36.8 g. (0.15 M) of 2-ethyl-2-(p-chlorphenyl)butyryl chloride. After complete addition, the reaction mixture is refluxed for 24 hours, cooled, and the silver chloride filtered off. The ether filtrate containing the 2-ethyl-2-(p-chlorphenyl)-butyrylisocyanate is added to a solution of 16.8 g. (0.2 M) of methoxyamine hydrochloride in 150 cc. of pyridine at room temperature. The mixture is allowed to stir at room temperature for one hour. The mixture is then heated to distill off the ether and the residue heated on a steam bath for two hours. The pyridine is removed under reduced pressure and the residue triturated with dilute hydrochloric acid (2%) to yield a white solid. The solid is purified by dissolving in 10% sodium hydroxide and reprecipitating with 10% HCl.

[The 2-ethyl-2-(p-chlorphenyl)butyryl chloride was prepared by first reacting p-chlorophenylacetonitrile with ethyl iodide and sodamide as described in Bull. Soc. Chim. 7, 670 (1910), for 2-ethyl-2-phenylbutyrylnitrile, to yield 2-ethyl-2-(p-chlorphenyl)butyryl nitrile. This nitrile is then hydrolyzed using $NaNO_2$ and $H_2SO_4$ to yield 2-ethyl-2-(p-chlorphenyl)butyric acid, by the method described by Schuevch and Huntvess (Journal of the American Chemical Society, 70, 2826, 1948). The acid is then converted to the acid chloride with thionyl chloride in the usual manner.]

EXAMPLE XXIX

*1-[2-ethyl-2-(p-methoxyphenyl)butyryl]-3-hydroxyurea*

Following the procedure of Example XXVIII, but substituting 33.7 g. (0.15 M) of 2-ethyl-2-(p-methoxyphenyl)butyryl chloride for the 2-ethyl-2-(p-chlorphenyl)-butyryl chloride, 1-[2-ethyl-2-(p-methoxyphenyl)butyryl]-3-hydroxyurea is obtained. The 2-ethyl-2-(p-methoxyphenyl)butyryl chloride is obtained by the method described in Example XXVIII for preparing 2-ethyl-2-(p-chlorphenyl)butyryl chloride, substituting p-methoxyphenylacetonitrile for the p-chlorphenylacetonitrile.

The invention may be variously otherwise embodied within the scope of the appended claims.

What is claimed is:

1. A compound selected from the class consisting of a compound of the formula

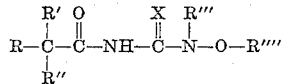

wherein R is a member of the group consisting of hydrogen, lower alkyl, lower alkenyl, phenyl halophenyl (lower alkyl), phenyl (lower alkoxy)phenyl, and phenyl(lower alkyl); R' and R" are each members of the group consisting of hydrogen, lower alkyl, phenyl, halophenyl (lower alkyl)phenyl, and (lower alkoxy)phenyl; and together with the carbon to which they are joined R' and R" is cycloalkyl of less than eight carbon atoms; and together with the carbon to which they are joined R, R' and R" is a member of the group consisting of phenyl and pyridyl; R''' and R'''' are each members of the group consisting of hydrogen and lower alkyl and X is a member of the group consisting of O and S; and pharmacologically acceptable salts thereof with bases.

2. A compound of the formula

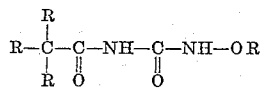

wherein R is lower alkyl.

3. 1-(2,2-diethylbutyryl)-3-methoxyurea.

4. A compound of the formula

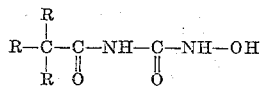

wherein R is lower alkyl.

5. 1-(2,2-diethylbutyryl)-3-hydroxyurea.

6. A compound of the formula

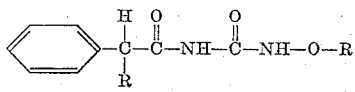

wherein R is lower alkyl.

7. 3-methoxy-1-(2-phenylbutyryl)urea.

8. A compound of the formula

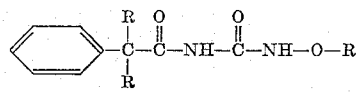

wherein R is lower alkyl.

9. 1-(2-ethyl-2-phenylbutyryl)-3-methoxyurea.

No references cited.